(12) United States Patent
Courtay et al.

(10) Patent No.: US 9,444,837 B2
(45) Date of Patent: Sep. 13, 2016

(54) PROCESS AND DEVICES FOR SELECTIVE COLLISION DETECTION

(75) Inventors: Olivier Courtay, Rennes (FR); Nicolas Prigent, Rennes (FR)

(73) Assignee: THOMSON LICENSING, Boulgone-Billancourt (FR)

( * ) Notice: Subject to any disclaimer, the term of this patent is extended or adjusted under 35 U.S.C. 154(b) by 1326 days.

(21) Appl. No.: 11/652,932

(22) Filed: Jan. 12, 2007

(65) Prior Publication Data

US 2007/0237168 A1    Oct. 11, 2007

(30) Foreign Application Priority Data

Jan. 13, 2006    (EP) ..................................... 06300033

(51) Int. Cl.
| | |
|---|---|
| *H04L 29/06* | (2006.01) |
| *H04W 12/12* | (2009.01) |
| *H04L 12/54* | (2013.01) |
| *H04W 28/06* | (2009.01) |
| *H04B 7/185* | (2006.01) |
| *H04L 12/413* | (2006.01) |

(52) U.S. Cl.
CPC ....... *H04L 63/1441* (2013.01); *H04L 63/1466* (2013.01); *H04W 12/12* (2013.01); *H04B 7/18589* (2013.01); *H04L 12/413* (2013.01); *H04L 12/5602* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 4,598,285 A | * | 7/1986 | Hoshen | 370/448 |
| 4,661,950 A | * | 4/1987 | Kobayashi et al. | 370/445 |
| 4,965,792 A | * | 10/1990 | Yano | H04L 12/44 |
| | | | | 370/445 |
| 4,973,954 A | * | 11/1990 | Schwarz | H02J 13/00 |
| | | | | 307/3 |
| 5,040,175 A | | 8/1991 | Tuch et al. | |
| 5,187,709 A | * | 2/1993 | Williamson et al. | 370/445 |
| 5,353,287 A | * | 10/1994 | Kuddes et al. | 370/448 |
| 5,379,290 A | * | 1/1995 | Kleijne | 370/313 |
| 5,651,009 A | * | 7/1997 | Perreault et al. | 370/447 |
| 5,666,359 A | * | 9/1997 | Bennett | H04L 12/44 |
| | | | | 370/358 |
| 5,854,454 A | * | 12/1998 | Upender | H04L 12/40163 |
| | | | | 187/247 |
| 5,940,399 A | | 8/1999 | Weizman | |

(Continued)

FOREIGN PATENT DOCUMENTS

| | | |
|---|---|---|
| EP | 0909060 | 4/1999 |
| EP | 1519518 | 3/2005 |

(Continued)

OTHER PUBLICATIONS

P. Meunier: "Course 3: Network Security, Section 2", Jul. 30, 2004, XP002373781, Purdue University p. 6-p. 10.

(Continued)

*Primary Examiner* — Faruk Hamza
*Assistant Examiner* — Andrew Oh
(74) *Attorney, Agent, or Firm* — Tutunjian & Bitetto, P.C.

(57) ABSTRACT

The present invention concerns a method in a network including at least a first device and a second device, where the sending of a packet by two devices simultaneously generates a collision. The method includes the steps of emitting by the first device a packet comprising a first part, and a second part including at least an identification of a source and a destination of the packet, receiving the first part of the packet by the second device; and in the case of the second device detecting a collision during the reception of the second part of the packet, issuing a packet indicating collision detection by the second device.

5 Claims, 7 Drawing Sheets

(56) References Cited

U.S. PATENT DOCUMENTS

| | | | |
|---|---|---|---|
| 5,978,383 A * | 11/1999 | Molle | 370/445 |
| 6,108,345 A * | 8/2000 | Zhang | H04L 12/4625 370/401 |
| 6,178,161 B1 * | 1/2001 | Terry | 370/276 |
| 6,181,708 B1 * | 1/2001 | Quackenbush et al. | 370/445 |
| 6,339,599 B1 * | 1/2002 | Hwang et al. | 370/445 |
| 6,418,480 B1 * | 7/2002 | Rijhsinghani | 709/245 |
| 6,438,109 B1 * | 8/2002 | Karaoguz | H04L 12/2803 370/252 |
| 6,438,128 B1 * | 8/2002 | Kashyap | H04L 29/06 370/389 |
| 6,456,597 B1 * | 9/2002 | Bare | H04L 29/12009 370/252 |
| 6,539,028 B1 | 3/2003 | Soh et al. | |
| 6,643,296 B1 * | 11/2003 | Fukuhara | 370/445 |
| 6,697,887 B1 * | 2/2004 | Acharya | G06F 13/385 370/445 |
| 6,799,054 B2 * | 9/2004 | Shpak | H04L 47/245 370/322 |
| 6,831,925 B1 * | 12/2004 | Subrahmanyan | H04L 12/413 370/445 |
| 6,996,074 B2 * | 2/2006 | Garcia-Luna-Aceves et al. | 370/278 |
| 7,116,681 B1 * | 10/2006 | Hovell et al. | 370/466 |
| 2001/0033579 A1 * | 10/2001 | Nelson et al. | 370/447 |
| 2002/0176433 A1 * | 11/2002 | Zhu et al. | 370/422 |
| 2003/0072325 A1 | 4/2003 | Brandli et al. | |
| 2003/0217183 A1 * | 11/2003 | Rimmer et al. | 709/249 |
| 2003/0219042 A1 * | 11/2003 | Tosa | H04J 3/1617 370/540 |
| 2004/0001499 A1 * | 1/2004 | Patella | H04B 3/54 370/412 |
| 2004/0062243 A1 * | 4/2004 | Zhang et al. | 370/392 |
| 2005/0025131 A1 | 2/2005 | Ko et al. | |
| 2005/0041616 A1 | 2/2005 | Ginzburg et al. | |
| 2005/0058151 A1 * | 3/2005 | Yeh | 370/445 |
| 2005/0111480 A1 * | 5/2005 | Martin | 370/461 |
| 2005/0117549 A1 * | 6/2005 | Kanterakis | H04B 7/2628 370/335 |
| 2005/0125663 A1 | 6/2005 | Funk | |
| 2005/0185666 A1 | 8/2005 | Raya et al. | |
| 2005/0226159 A1 | 10/2005 | Terry et al. | |
| 2006/0198325 A1 * | 9/2006 | Gao et al. | 370/270 |

FOREIGN PATENT DOCUMENTS

| | | |
|---|---|---|
| WO | WO9621978 | 7/1996 |
| WO | WO9820648 | 5/1998 |
| WO | WO01/63839 | 8/2004 |
| WO | WO2005029774 | 3/2005 |

OTHER PUBLICATIONS

Search report dated Mar. 23, 2006.

Jiang et al:, "A handshake protocol for CDMA wireless LANs with error control capabilities", 1994 IEEE Asia-Pacific Conference on Circuits and Systems, Taipei, Taiwan, Dec. 5, 1994, pp. 39-44.

Kuo et al., "Enhanced backoff scheme in CSMA/CA for IEEE 802.11", 2003 IEEE Vehicular Technology Conference, Orlando, Florida, USA, Oct. 6, 2003, pp. 2809-2813.

Schmoyer et al., "Wireless intrusion detection and response: a classic study using main-in-the-middle attack", 2004 IEEE Wireless Communications and Networking Conference, Atlanta, Georgia, USA, Mar. 21, 2004, pp. 883-888.

Meunier, P., "Course 3: Network Security—Section 2", Course 3: Purdue University online course, http://projects.cerias.purdue.edu/secprog/class3/2.Phy_&Link.ppt, May 2004, pp. 1-28.

IEEE 802.3 Standard for Information Technology, "Part 3: Carrier sense multiple access with collision detection (CSMA/CD) access method and physical layer specifications", Mar. 8, 2002, pp. 1-1562.

IEEE 802.16 Conformance Standard, "Part 1: Protocol Implementation Conformance Statement (PICS) Proforma for 10-66 GHz WirelessMAN-SC Air Interface", Aug. 18, 2003, pp. 1-148.

IEEE 802.11 Standard, "Part 11: Wireless LAN Medium Access Control (MAC) and Physical Layer (PHY) Specifications", 1999 Edition, Reaffirmed Jun. 12, 2003, pp. 1-528.

Prigent et al., "Secure Long Term Communities in Ad Hoc Networks", 1st ACM Workshop on Security of Ad Hoc and Sensor Networks, Fairfax, Virginia, USA, Oct. 31, 2003, pp. 1-10.

Courtay et al., "Secure Device pairing under realistic conditions", 4th International Conference on Applied Cryptography and Network Security, Singapore, Malaysia, Jun. 6, 2006, pp. 1-14.

\* cited by examiner

PROCESS AND DEVICES FOR SELECTIVE COLLISION DETECTION

This application claims the benefit, under 35 U.S.C. §119 of European Patent Application No. 06300033.5, filed Jan. 13, 2006.

BACKGROUND OF THE INVENTION

The present invention relates to a process and devices for selective collision detection.

Carrier Sense Multiple Access (CSMA) mechanism is a commonly used scheme in network communications, where all the devices can send a message at any time on the network. Generally, a device verifies the absence of other traffic before sending a packet. Anyway, in this context, two stations can send a message at same time, in which case a collision occurs.

To prevent from collisions, two types of countermeasure have been defined. The Collision Detection (CSMA/CD) has been defined in the IEEE802.3 standard, document IEEE Standard 802.3—2002 Edition, dated 8 Mar. 2002. The Collision Avoidance (CSMA/CA) has been defined in the IEEE802.11 standard, document IEEE Standard 802.11—2003 Edition.

With CSMA/CD, a device detects the collisions by listening to the carrier at the time of sending the message. A collision is detected if there is a difference between what was sent and what was received.

With CSMA/CA, a device avoids collision by asking availability of the medium before emitting. The IEEE802.11 standard defines the Request To Send packet, noted RTS and the Clear To Send packet, noted CTS. A first device willing to send a data packet first sends a RTS packet to a second device and waits for a CTS packet from the second device before sending the data packet. When the second device has successfully received the data packet, it sends an acknowledgement control packet, noted ACK. An emitter device that receives the ACK signalization deduces that no collision occurred.

In current technologies, the ACK signalization is not authenticated. Authenticated acknowledgment could be used to know if the sender of the acknowledgment is the correct receiver of the data packet. Nevertheless, it would require a preexisting context with the right key material, and cryptographic solution which cannot be always available.

A type of attack, as described hereafter, is made possible in a CSMA/CA scheme of a wireless local area network, noted WLAN, because all devices of the WLAN receive data at the same time.

In a WLAN of IEEE802.11 type, a first device sends data packet to a second device. When receiving the data packet the second device sends an ACK packet to the first device.

An attacker is comprised of a third device, located close to the first device and a fourth device located close to the second device. As soon as the first device sends a data packet to the second device, the fourth device sends a packet, which produces a collision in the network. In addition the third device always acknowledges the packets sent by the first device. As a result the second device does not receive any message from the first device, and the first device considers that the second device has correctly received the message.

This selective destruction of messages attack is often used to prepare a Man-In-The-Middle attack. The attacker may generate a collision for each packet, in an unselective way. In this case, no packet is correctly received on the network and all devices quickly discover that the network is unavailable or under attack.

The attacker may also generate a collision for some packets only, in a selective way. Generally, all the bits of a packet are not sent at the same time, but sequentially. The attacker then waits for getting information on source or destination address. And as soon as it gets the information on the addresses, it generates a collision.

U.S. Pat. No. 6,643,296 deals with a system for controlling frame collision, enabling retry of transmission earlier in a wireless LAN. Notably it describes several mechanisms for detecting collisions and reemitting the transmitted packet as soon as possible.

The course on network security, section 2 from P. Meunier, 30 Jul. 2004, XP002373781 deals with network security and various possible attacks in the scope of Address Resolution Protocol, noted ARP, CSMA/CA and CSMA/CD.

SUMMARY OF THE INVENTION

The present invention concerns a method in a network comprising at least a first device and a second device, where the sending of a packet by two devices simultaneously generates a collision.

According to the invention, the method comprises, at the second device, the steps of:
  receiving a packet comprising a first part and a second part, said second part comprising at least an identification of a source address and a destination address of the packet;
  in the case of detecting a collision during the reception of the first part of the packet, not issuing a packet indicating a collision detection; and
  in the case of the second device detecting a collision during the reception of the second part of the packet, after having correctly receiving said first part of said packet, issuing a packet indicating a collision detection.

On detection of a collision in the reception of a packet, the second device sends collision detection information to the first device. Surprisingly, the second device does not send a collision detection packet to the first device for all the collision it detects. It sends a collision detection packet only if the collision occurs after the second has received a part of the packet, and this part has been correctly received without any collision. The collisions occurring during the reception of the first part of the packet are not pointed out. If a selective attack as described above in the document occurs, the method enhances the detection of collisions related to the selective attack, because an attacker has to wait for getting information on source or destination address before performing the attack.

According to the invention, in the case of the second device not detecting any collision during the reception of the packet, the method comprises the steps of issuing a packet indicating no collision detection.

Even if the second device has not detected a collision during the reception of the packet, it sends a confirmation to the first device that it has not detected any collision. The first device may then know that the second device has received the packet at least without any collision.

According to an embodiment the step of receiving the first part of the packet comprises a step of detecting a collision detection field in the first part of the packet.

The first part of the packet comprises an indication on whether the collision detection mechanism is to be performed on the packet or not. Advantageously the indication is located in the first part of the packet. If a selective attack as described above in the document occurs, the second device is then aware of the collision detection mechanism before the attack.

According to an embodiment the network is a wireless local area network.

Another object of the invention is a method in a network comprising at least a first device and a second device, where the sending of a packet by two devices simultaneously generates a collision. According to the invention, the method comprises, at the first device, the steps of emitting a packet comprising a first part comprising a collision detection field, and a second part comprising at least an identification of a source and a destination of the packet.

According to an embodiment, it comprises, at the first device, a step of detecting either the reception of a packet indicating a collision detection or the reception of a packet indicating no collision detection.

Another object of the invention is a device intended to send a packet on a network where the sending of a packet by two devices simultaneously generates a collision, wherein the packet comprises a first part and a second part containing at least an identification of a source and a destination of the packet. The device comprises means for indicating collision detection field in the first part of the packet to be sent on the network; and means for sending the packet with the collision detection information.

According to an embodiment, the device comprises means for detecting the reception of a packet indicating a collision detection and the reception of a packet indicating no collision detection.

Another object of the invention is a device intended to receive a packet, the packet comprising a first part with collision detection field and a second part containing at least an identification of a source and a destination of the packet, in a network where the sending of a packet by two devices simultaneously generates a collision. The device comprises means for identifying collision detection field in the first part of the received packet, means for detecting a collision during the reception of the second part of the packet and means for issuing a packet indicating a collision detection in the case of detecting a collision by the detecting means and for issuing a packet indicating no collision detection in the case of not detecting any collision by the detecting means.

BRIEF DESCRIPTION OF THE DRAWINGS

The invention will be better understood and illustrated by means of the following embodiment and execution examples, in no way restrictive, with reference to the appended figures among which.

Figure 6:
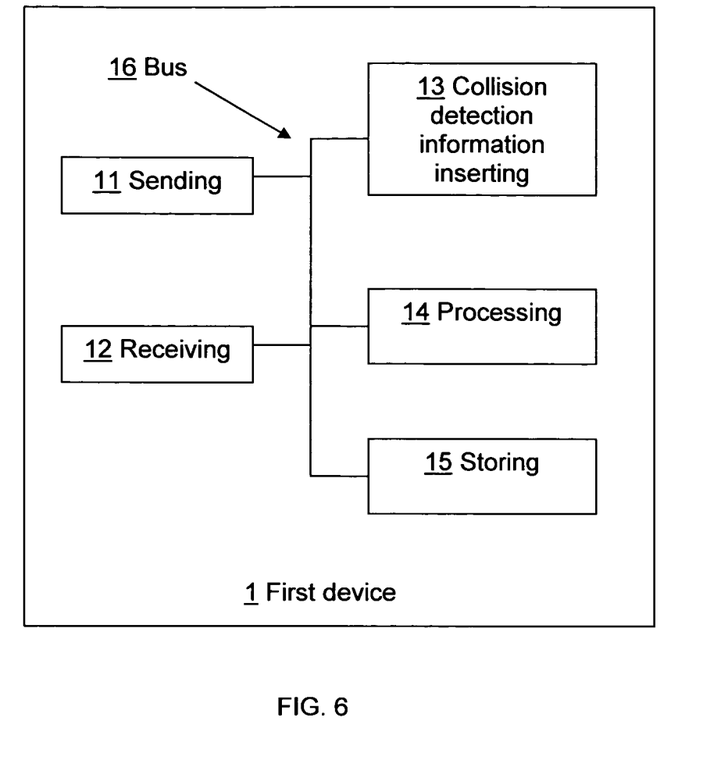
FIG. 6 is a block diagram detailing the first device of FIG. 1.
Figure 7:
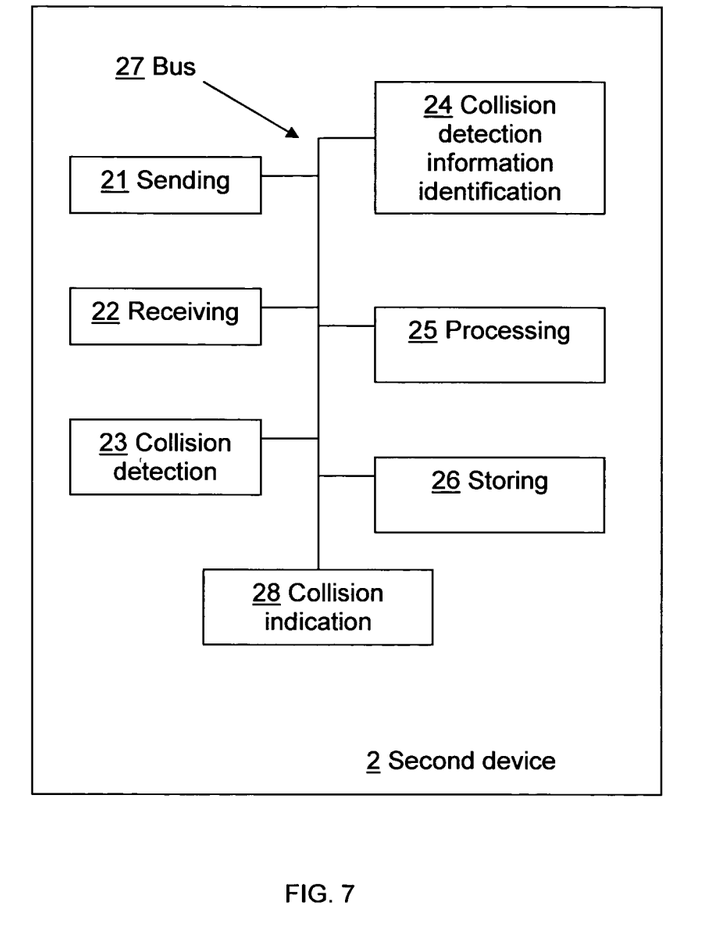
FIG. 7 is a block diagram detailing the second device of FIG. 1.

In FIGS. 6 and 7, the represented blocks are purely functional entities, which do not necessarily correspond to physical separated entities. Namely, they could be developed in the form of software, or be implemented in one or several integrated circuits.

The exemplary embodiment comes within the framework of a transmission on an IEEE802.11 wireless local area network, but the invention is not limited to this particular environment and may be applied within other types of network, where collision may occur.

DETAILED DESCRIPTION OF AN EMBODIMENT OF THE INVENTION

Figure 1:
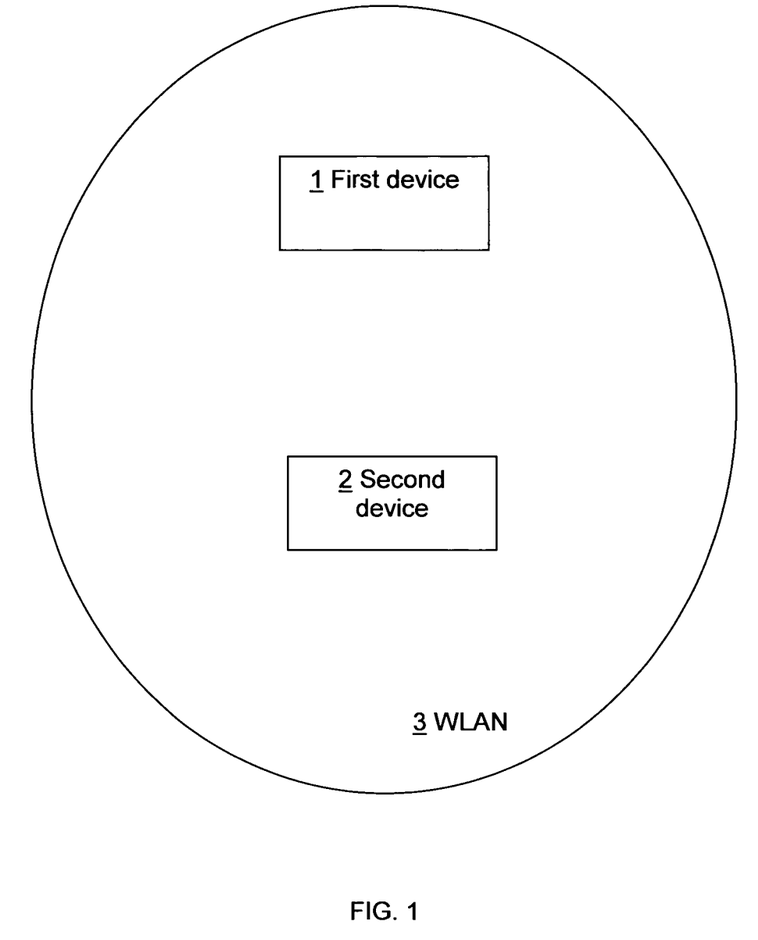
FIG. 1 is a block diagram illustrating the devices according to the embodiment.

The FIG. 1 represents a first device 1 and a second device 2 in a network 3 according to the embodiment. The network 3 is a wireless local area network that conforms to the IEEE 802.11 standard. The first device 1 and the second device 2 might be either an access point or a station compliant to the IEEE802.11 family of standards.

Of course the network 3 may comprise other devices which are not shown in the figure.

Figure 2:
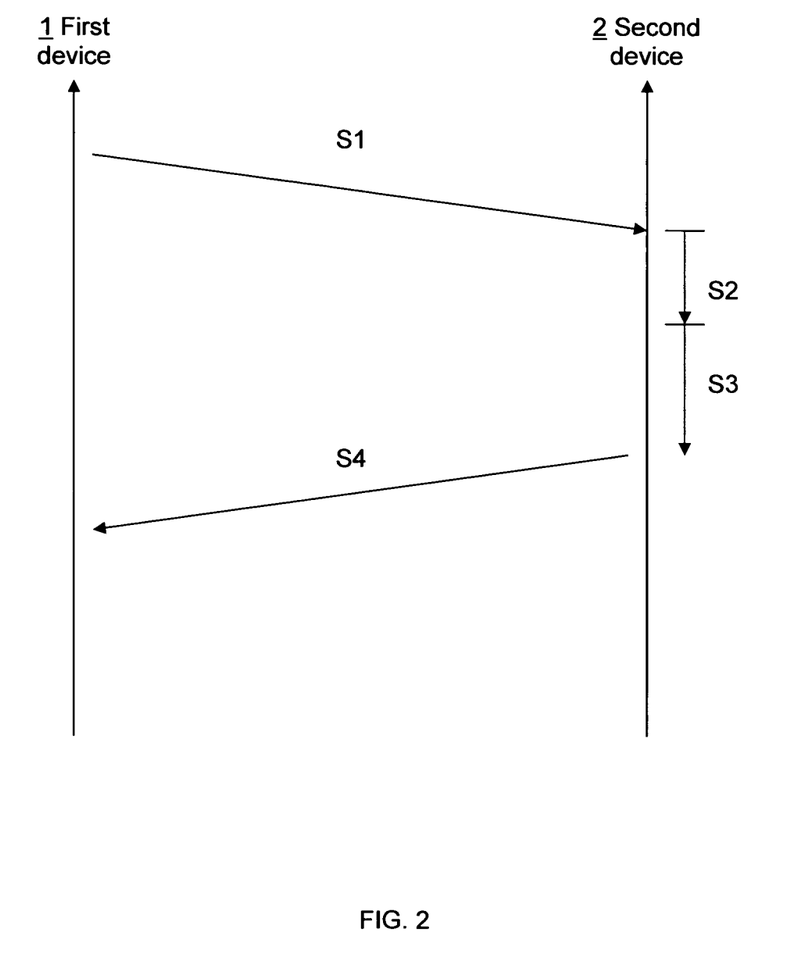
FIG. 2 is a representation of a data exchange between a sending device and a receiving device.

The FIG. 2 indicates the different steps in the collision detection mechanism.

At step S1, the first device 1 sends a packet to the second device 2;

At step S2 the second device receives the first part of the packet. It detects that the packet is a protected packet;

At step S3 the second device receives the second part of the packet;

At step S4, as the second device has not detected a collision, it sends a NoCOLL packet. If it detects a collision during the reception of the second part of the packet, it sends a COLL packet.

The collision detection is performed selectively for some packets received by the second device. It might be done for all the packets received. It might be done for a subset of packet, as for example all the data packets. According to the embodiment it can be done for a selection of some packets. The first device indicates collision detection field in the packet, so that the second device can identify such packets.

A packet with collision detection field is a protected packet; it involves the collision detection mechanism in the receiver.

Figure 3:
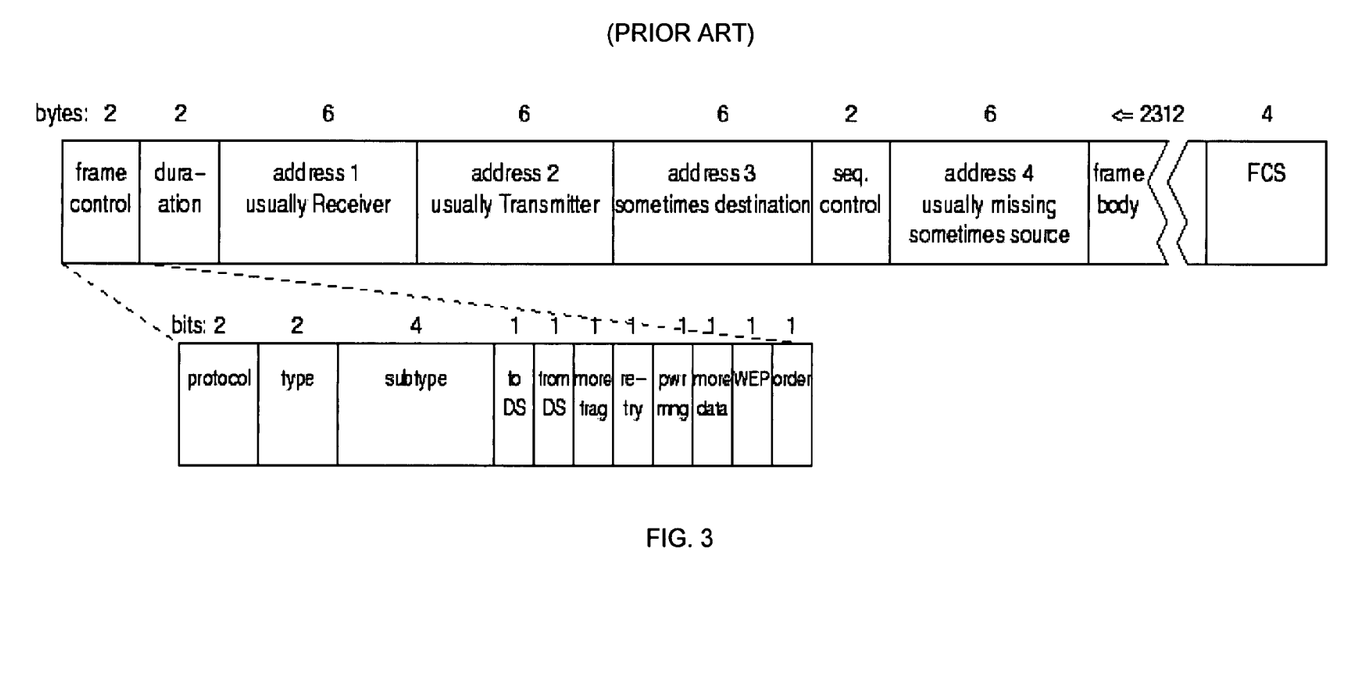
FIG. 3 is representation of the Medium Access Control frame format according to the IEEE802.11 standard.

The FIG. 3 is a diagram representing the IEEE802.11 Medium Access Control frame format according to the IEEE802.11 standard. It comprises a frame control field, which comprises the type and subtype fields. According to the embodiment, the collision detection field is indicated in a flag, in the control frame, within the type and subtype fields. The packet sent by the first device to the second device is a data packet, with a type identification field value of 10, as indicated in the standard. The identification of the collision detection field is indicated with a subtype field value of 1101.

The collision detection packet, noted COLL, is a control packet, identified with type field value of 01 and subtype field value of 0010. The no collision detection packet, noted NoCOLL, is a control packet with type field value of 01 and subtype field value of 0001.

The collision detection field is indicated in the frame prior to the address fields. It could be indicated with other means than the type and subtype fields if some fields are available in the frame prior to the source and destination fields of the packet.

According to the embodiment, the first part of the packet corresponds to the fields of the frame located before the address fields, comprising the frame control and the duration fields. The second part of the packet comprises the address fields and the remaining fields of the frame.

In another embodiment, the frame does not comprise any address field but a connection identifier, as in the IEEE802.16 standard. The connection identifier implicitly indicates the source and the destination addresses of the packet. The collision detection field is then also indicated in the frame prior to the connection identifier field.

The bits of a packet are not sent at the same time, but sequentially. The receiver receives the frame control before it receives the address fields. It can identify whether the packet is protected even before receiving the address field, i.e. before knowing if it is the destination of the packet. An attacker also waits for the reception of the address fields before creating a selective collision. When a collision occurs, the receiver already knows that the packet is protected.

Figure 4:
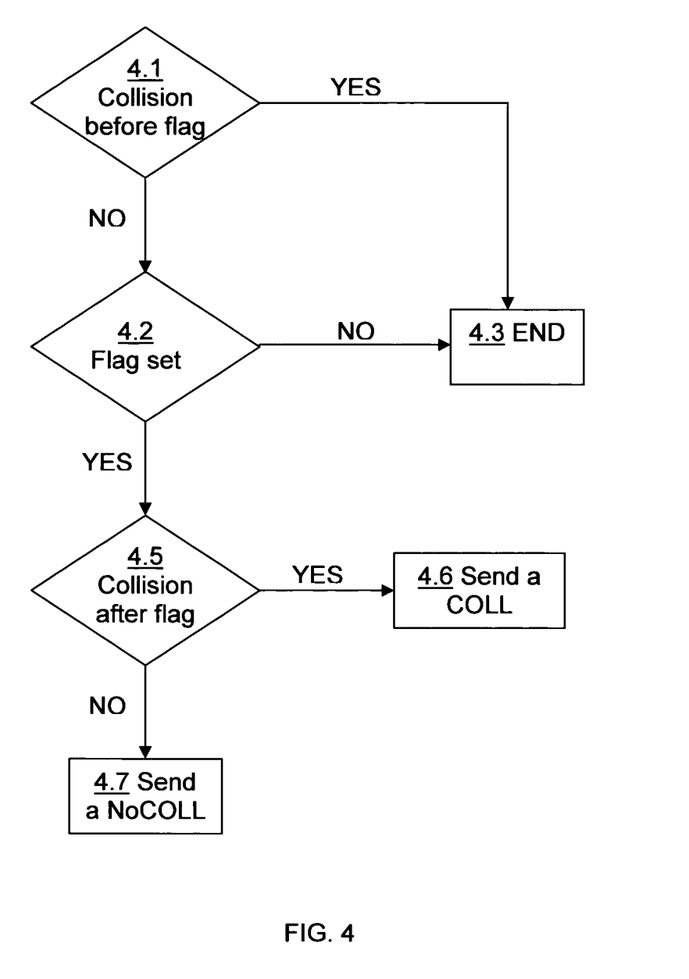
FIG. 4 is a flow chart representing the behaviour of the receiving device.

The behaviour of the second device is indicated in the FIG. 4. If a collision occurs 4.1 before the second device can check the collision detection information, the packet is dropped 4.3 without any indication to the first device.

When the second device receives a packet, it checks whether the collision detection field is indicated or not 4.2. If it is not indicated it does not start the collision detection mechanism 4.3. If the collision detection field is indicated, it starts the collision detection mechanism for this packet; it checks whether it detects a collision or not 4.5. If a collision occurs it sends a COLL packet 4.6. If no collision occurs, it sends a NoCOLL packet 4.7. The COLL and the NoCOLL packets are addressed to the first device, but they do not comprise any source or destination address.

The mechanism permits to detect a collision that occurs at the same time as the reception of the identification of the source and destination addresses of the packet.

Even if the COLL and NoCOLL packets do not comprise any source or destination addresses, the first device knows for which packet they are related. The first device is not intended to use the collision detection mechanism for many packets, and even less simultaneously. It is then able to detect the emitter of the COLL and NoCOLL packets, and then the packet they are related to.

Figure 5:
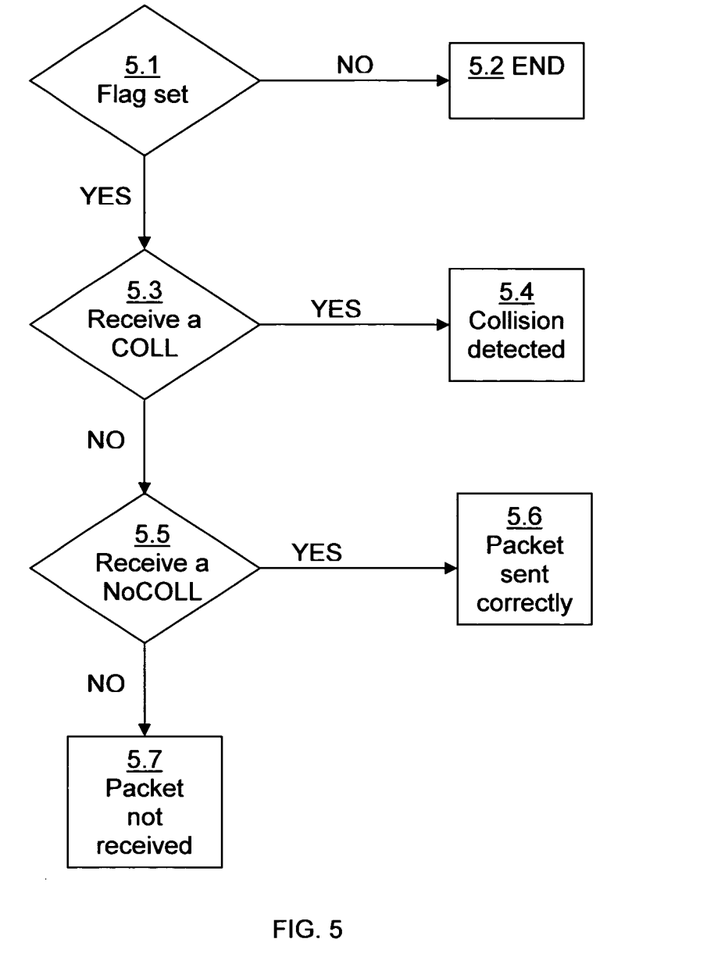
FIG. 5 is a flow chart representing the behaviour of the sending device.

The behaviour of the first device is depicted in FIG. 5 according to the collision detection mechanism.

The first device decides on using the collision detection mechanism for the packet or not 5.1.

If the first device does not set the flag, the mechanism is not initiated for this packet 5.2. If it sets the flag, the mechanism is used for this packet.

If the first device receives a COLL packet 5.3, a collision has been detected 5.4.

If the first device does not receive a COLL and receives a NoCOLL packet 5.5, the packet has been correctly sent to the receiving device 5.6.

If the first device does not receive a COLL neither a NoCOLL, the first device assumes that the second device has not received the packet 5.7.

The FIG. 6 is a block diagram of the first device 1. It comprises processing means 14, storing means 15, sending means 11, receiving means 12, and collision detection field inserting means 13. It also comprises means for interconnecting all the preceding means, a bus 16.

The FIG. 7 is a clock diagram of the second device 2. It comprises sending means 21, receiving means 22, collision detection means 23, collision detection field identification means 24, processing means 25, storing means 26, and collision indication means 28. It also comprises means for interconnecting all the preceding means, a bus 27.

The invention claimed is:

1. Method in a network comprising at least a first device and a second device, where the sending of a packet by two devices simultaneously generates a collision, wherein it comprises, at the second device, the steps of:
   receiving a packet comprising a first part and a second part, said second part comprising at least an identification of a source address and a destination address of the packet;
   in the case of detecting a collision during the reception of the first part of the packet, not issuing a packet indicating a collision detection; and
   in the case of detecting a collision during the reception of the second part of the packet, after having correctly receiving said first part of said packet, issuing a packet indicating a collision detection,
   wherein said packet indicating a collision detection does not comprise any source or destination address.

2. Method according to claim 1, wherein in the case of not detecting any collision during the reception of the packet, the method further comprises the step of issuing a packet indicating no collision detection, wherein said packet indicating no collision detection does not comprise any source or destination address.

3. Method according to claim 1, wherein the step of receiving said first part of said packet comprises a step of identifying whether a collision detection field is present in said first part of the packet, and if said field is present, performing collision detection mechanism for said packet.

4. Method according to claim 1 wherein that said network is a wireless local area network.

5. Device intended to receive a packet, said packet comprising a first part with collision detection field and a second part containing at least an identification of a source and a destination of the packet, in a network where the sending of a packet by two devices simultaneously generates a collision, wherein said device comprising:
   means for identifying collision detection field in said first part of said received packet;
   means for detecting a collision during the reception of the second part of the packet;
   means for issuing a packet indicating a collision detection in the case of detecting a collision during the reception of the second part of the packet, after having correctly received said first part of said packet without collision, and not issuing a packet indicating a collision detection in the case of detecting a collision during the reception of the first part of the packet, wherein said packets indicating a collision detection and no collision detection do not comprise any source or destination address.

* * * * *